June 25, 1957     S. PROTOPAPA ET AL     2,796,668
INTERNAL PLANIMETER

Filed March 29, 1956     2 Sheets-Sheet 1

INVENTORS.
SEJFI PROTOPAPA
BENJAMIN W. ELA, JR.
JAMES MANDYCK
BY
Knox & Knox

June 25, 1957 S. PROTOPAPA ET AL 2,796,668
INTERNAL PLANIMETER
Filed March 29, 1956 2 Sheets-Sheet 2

INVENTORS.
SEJFI PROTOPAPA
BENJAMIN W. ELA, JR.
JAMES MANDYCK
BY
Knox & Knox

United States Patent Office 2,796,668
Patented June 25, 1957

2,796,668

INTERNAL PLANIMETER

Sejfi Protopapa, Berkeley, Benjamin W. Ela, Jr., Lemon Grove, and James Mandyck, La Mesa, Calif., assignors to The Ryan Aeronautical Co., San Diego, Calif., a corporation of California Application March 29, 1956, Serial No. 574,684

3 Claims. (Cl. 33—122)

The present invention relates generally to area measuring instruments and more particularly to an internal planimeter for measuring the internal cross sectional area of irregular sections such as nozzles, corrugated tailpipes, and the like.

The primary object of this invention is to provide an instrument facilitating the accurate measurement of internal areas of substantially tubular shells.

Another object of this invention is to provide an instrument of the aforementioned character having a surface contacting tracer point, and mechanical means of maintaining contact between said point and said surface.

Another object of this invention is to provide an internal area measuring instrument having remote drive means, allowing accurate measuring of internal areas remote from either end of the object tube.

Another object of this invention is to provide an instrument to provide an accurate, reduced scale trace of any inner convolutions of substantially tubular shells.

Another object of this invention is to provide an internal area measuring instrument which need not be centered within the object tube.

Another object of this invention is to provide an instrument which is adapted for fabrication from many different materials, so that the choice of material can be according to the dictates of availability and price considerations, the exact sizes and proportions being matters easily determined to suit particular conditions and needs.

Another object of this invention is to provide an instrument which is practicable and inexpensive to manufacture.

Finally, it is an object to provide an instrument of the aforementioned character which is simple, and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawing.

In many industries there is a great need for the accurate measurement of internal areas of irregular tubes.

This is particularly true in the aircraft industry where, with the advent of jet, rocket and turbo-prop propulsion, the use of jet nozzles, tailpipes and the like has become common.

It has been noted in practice that very minute deviations from the design specifications of such tubular sections usually results in marked differences in the performance. Therefore, very accurate measurements must be taken to assure that the cross sectional area and the eccentricity at any specific plane of the nozzle or tailpipe under consideration conforms exactly with the design specification.

The use of a conventional commercial planimeter is greatly to be desired in this type of area measurements, since the accuracy of the instrument is well known but manual operation of this or any other usable instrument is sometimes prohibited by the length of the nozzle or tailpipe.

In practically all instances, it is necessary to obtain an accurate trace of the area to be measured and then, in a subsequent operation, planimetering the trace pattern to obtain the area. This presents the problem of human error, since it is highly improbable that the tracer point of a planimeter can be moved along a trace line without some deviation therefrom. The herein disclosed invention solves these problems.

Figures 1, 2, 3:
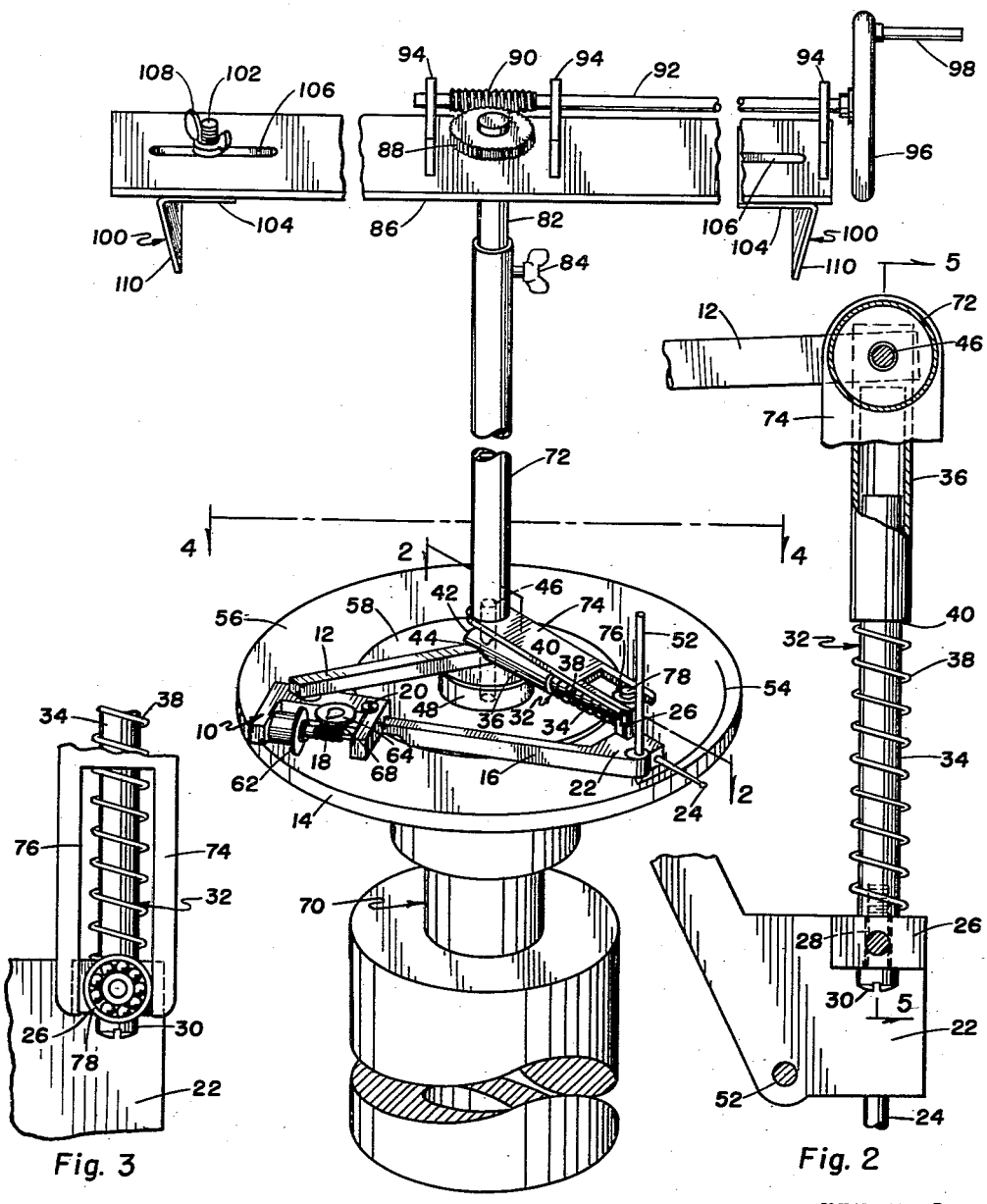
Figure 1 is a perspective view of the instrument including the mechanical means of contacting the internal surface of the section to be measured, the remote driving mechanism and a means of positioning the instrument at the desired location within a tubular object to be measured.
Figure 2 is a plan view of the spring arm taken on the line 2—2 of Figure 1, the polar arm and the tracer arm being shown fragmentarily.
Figure 3 is a plan view of a portion of slotted end of the driving arm showing the means of engagement of the tracer head to allow free radial flexure of the spring arm, the tracer head and the spring arm being shown fragmentarily.
Figure 4:
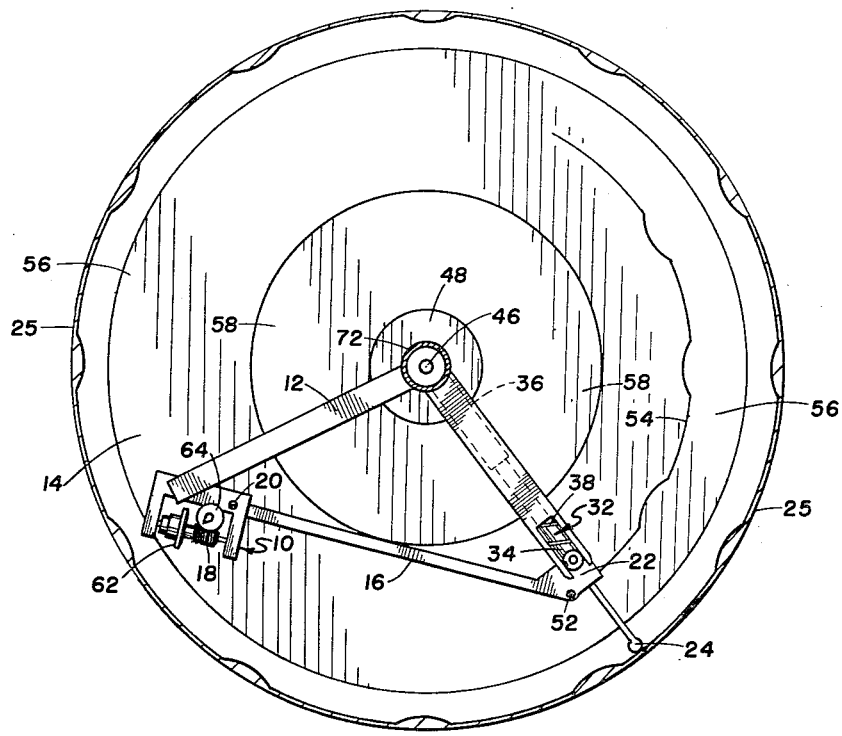
Figure 4 is a view of the instrument taken on the line 4—4 of Figure 1.

Referring now to the drawings and first specifically to Figure 1, the instant invention is shown as comprising a conventional commercial planimeter body 10, having one end of a polar arm 12 pivotally attached thereto, the other end of said polar arm 12 being pivotally connected to the center of a circular table 14. A reach bar 16 extends from the body 10 parallel to the axis of the worm gear 18 of the body 10. The reach bar 16 is in slidable engagement with the body 10, a locking screw 20 being provided for adjustment of the length of the bar 16. The head 22 is positioned on the end of the reach bar 16 and a tracer point 24 extends outwardly therefrom to contact the object being measured, represented in Figure 4 as a tube 25.

A pivot block 26 is engaged with the upper surface of the head 22 and is provided with a bore 28 through which a screw 30 passes and threadedly engages one end of a telescopic arm 32.

Figure 5:
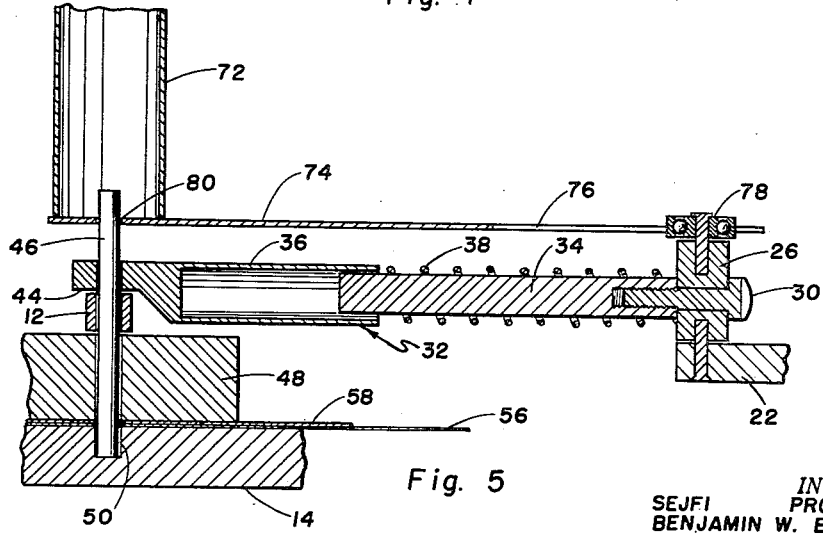
Figure 5 is a sectional view taken on the line 5—5 of Figure 2, and including a portion of the driving tube, the driving arm, the spacing block, paper disc, paper holding disc, and adjacent portions.

As best shown in Figure 2, the telescopic arm 32 comprises a cylindrical bar 34 and a complementary element 36. The tubular portion of the element 36 receives the other end of the bar 34 in axial sliding relationship. A compression spring 38 is mounted coaxially on the bar 34 and is compressed between the pivot block 26 and the end 40 of the element 36. The pivot end 42 of the element 36 is provided with a flattened portion 44 which rests on the polar arm 12. A pivot pin 46 extends through both the polar arm 12 and the element 36 and a spacing block 48 and rests in a socket 50 provided in the table 14 as illustrated in Figure 5.

A tracing pen 52 extending through the head 22 is used to provide an accurately scaled trace line 54 on a paper disc 56 held securely on the table 14 by a thin metallic disc 58. The discs 56, 58 are provided with bores to receive the pivot pin 46. If no trace of the area is required, the pen 52 may be removed and replaced by a leg to maintain the necessary elevation of the head 22.

The internal planimeter integrates the area traversed by the tracer point 24 by means of the proportionate slippage and rotation of the wheel 62 on the table, the area being determined from readings taken from the wheel 62 which is calibrated and a dial 64. The dial is actuated by the worm 18 turned by the wheel 62, and a pinion 68 axially attached to the dial. Since the basic operation of a planimeter is well known, no further attempt at description of said operation will be undertaken herein.

The spring 38 biases the head 22 outwardly, assuring firm contact of the tracer point 24 with the object 25 being measured. The maximum radial motion of the head 22, being limited only by the lengths of the bar 34 and the element 36, makes unnecessary the exact centering of the table 14. The table 14 may be located at any point provided that the point 24 can maintain firm contact with the object tube 25 on at least one complete revolution of the said point 24.

Vertical positioning of the internal planimeter within the object tube 25 may be accomplished by means of a screw jack 70 or any other means of elevating or lowering the table 14.

Since it will be obvious that remote measurements will at times prohibit manual operations of the planimeter, a remote driving means is provided. Said driving means comprises a pillar 72 having a driving arm 74 attached normally to the lower end thereof. The driving arm 74 extends radially outwardly of one side of the pillar 72, and is provided with a slot 76 in the outer end. A pivotal bearing 78 mounted on top of the pivot block 26 rides in the slot 76, the slot 76 being slightly wider than the diameter of the bearing 78 and of a depth to allow full flexure of the spring arm 32.

A driving arm bore 80 is located axially of the pillar 72, the lower end of which is secured to the driving arm and the upper end of the pivot pin 46 is removably received in the bore 80. Since the slotted driving arm 74 is easily operatively connected and disconnected on the bearing 78, it will be evident that the complete mechanical driving assembly, including the driving arm 74, can be easily removed from the remaining portions of the instrument whenever desirable.

A driving spindle 82 is axially slidable in the pillar 72, and may be fixed thereto by an adjusting screw 84 extending through the wall of the pillar 72 and contacting the spindle 82, the spindle 82 and pillar 72 being telescopically associated. The spindle 82 extends a slight distance upwardly through a cross member 86, and a relatively large pinion gear 88 is fixedly mounted thereon. A worm gear 90 operatively engages the pinion gear 88 and is attached to a shaft 92, said shaft being journalled in bearing brackets 94 and lying parallel to the cross member 86. A crank wheel 96 having a handle 98 is fixedly attached to the end of the shaft 92 disposed outwardly of the end of the cross member 86.

Clamp plates 100 are provided on the under side of the cross member 86 as a means of rigidly positioning the driving mechanism on one end of the object tube 25. The plates 100 are made adjustable by means of screws 102 secured to an upper, horizontal flange 104 of each plate 100 and extending through longitudinal slots 106 in the cross member 86, with wing nuts 108 on said screws engaging said cross member. This structure provides convenient means for adjusting the flanges 110 of the plates 100 into internal contact with the rim of the object tube 25. A C-clamp or the like may be used to effect the actual clamping. The adjustable clamp plates 100 allow centering of the cross member 86 over the table, although the table need not be centered within the object tube 25.

Assuming the cross member 86 to be securely locked in the desired position, the operation of the drive mechanism may be clearly followed. Rotation of the crank wheel 96 rotates the worm gear 90 on the shaft 92. The worm gear 90, being in engagement with the pinion gear 88, produces rotation in the driving spindle 82, the pillar 72 thereby causing the driving arm 74 to rotate about the axis of the spindle 82, and the pillar 72. The driving arm at one side of the slot 76 exerts a tangential force against the pivotal bearing 78, thereby causing the planimeter to rotate about the pivot pin 46.

As the tracer point 24 moves radially as eccentricities in the object tube 25 are encountered, the pivotal bearing 78 moves inwardly or outwardly freely of the slot 76.

It is understood that minor variation from the form of the invention disclosed herein may be made without departure from the spirit and scope of the invention, and that the specification and drawing are to be considered as merely illustrative rather than limiting.

We claim:

1. A measuring instrument comprising: a pillar; remote drive means for slowly rotating said pillar; a driving arm fixed to said pillar and extending radially therefrom; a polar arm extending radially from the axis of said pillar at an acute angle to said driving arm and mounted for free rotation about said axis; a reach bar having one end portion pivotally secured to the end of said polar arm remote from said pillar and having the other end portion thereof connected to said driving arm for limited movement longitudinally of the drive arm and being biased to move away from said axis; a planimeter operatively mounted on said reach bar adjacent to said polar arm; and a tracer point operativley mounted on said other end of the reach bar.

2. A measuring instrument comprising: a pillar; remote drive means for slowly rotating said pillar; a driving arm fixed to said pillar and extending radially therefrom; a polar arm extending radially from the axis of said pillar at an acute angle to said driving arm and mounted for free rotation about said axis; a reach bar having one end portion pivotally secured to the end of said polar arm remote from said pillar and having the other end portion thereof connected to said driving arm for limited movement longitudinally of the drive arm and being biased to move away from said axis; a planimeter operatively mounted on said reach bar adjacent to said polar arm; and a tracer point operatively mounted on said other end of the reach bar; said drive arm having a slot adjacent to the end thereof remote from the pillar and extending longitudinally of the drive arm; a pivot element on said other end portion of said reach bar slidably mounted in said slot; a telescoping arm mounted for rotation about the axis of said pillar; and a spring operatively mounted on said telescoping arm to bias said pivot element away from said pillar.

3. A measuring instrument comprising: a pillar; remote drive means for slowly rotating said pillar; a driving arm fixed to said pillar and extending radially therefrom; a polar arm extending radially from the axis of said pillar at an acute angle to said driving arm and mounted for free rotation about said axis; a reach bar having one end portion pivotally secured to the end of said polar arm remote from said pillar and having the other end portion thereof connected to said driving arm for limited movement longitudinally of the drive arm and being biased to move away from said axis; a planimeter operatively mounted on said reach bar adjacent to said polar arm; and a tracer point operatively mounted on said other end of the reach bar; said remote drive means comprising an extending portion of said pillar; a pinion fixed to said extending portion; a cross member having means for securement to one end of a hollow member to be measured; and means to drive said pinion mounted on said cross member.

References Cited in the file of this patent

UNITED STATES PATENTS

| 1,124,784 | Monro | Jan. 12, 1915 |
| 1,174,649 | Airey et al. | Mar. 7, 1916 |
| 1,403,156 | Gonzalez | Jan. 10, 1922 |

FOREIGN PATENTS

| 442,467 | France | June 21, 1912 |